US011313966B2

(12) United States Patent
Fleurey et al.

(10) Patent No.: US 11,313,966 B2
(45) Date of Patent: Apr. 26, 2022

(54) VELOCITY DETECTION IN AUTONOMOUS DEVICES

(71) Applicant: SINTEF TTO AS, Trondheim (NO)

(72) Inventors: Franck Fleurey, Trondheim (NO); Jakob Høgenes, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 0 days.

(21) Appl. No.: 16/959,720

(22) PCT Filed: Dec. 21, 2018

(86) PCT No.: PCT/GB2018/053755
§ 371 (c)(1),
(2) Date: Jul. 2, 2020

(87) PCT Pub. No.: WO2019/135067
PCT Pub. Date: Jul. 11, 2019

(65) Prior Publication Data
US 2020/0348413 A1 Nov. 5, 2020

(30) Foreign Application Priority Data
Jan. 2, 2018 (GB) ...................... 1800028

(51) Int. Cl.
*G01S 15/58* (2006.01)
*G01C 21/16* (2006.01)
(Continued)

(52) U.S. Cl.
CPC .............. *G01S 15/582* (2013.01); *G01C 3/00* (2013.01); *G01C 21/16* (2013.01); *G01L 19/0092* (2013.01)

(58) Field of Classification Search
CPC ....... G01S 15/582; G01S 15/88; G01C 21/16; G01C 3/00; G01L 19/0092
(Continued)

(56) References Cited

U.S. PATENT DOCUMENTS 4,017,823 A 4/1977 Cooke et al.
4,728,954 A * 3/1988 Phelan .................... G01S 15/60
342/115
(Continued)

FOREIGN PATENT DOCUMENTS

CN 103144770 A 6/2013
DE 102015111264 A 1/2017
(Continued)

OTHER PUBLICATIONS

International Search Report and Written Opinion for International Patent Application No. PCT/GB2018/053755, dated Mar. 14, 2019, 14 pages.
(Continued)

*Primary Examiner* — Daniel L Murphy
(74) *Attorney, Agent, or Firm* — Withrow & Terranova, P.L.L.C.; Vincent K. Gustafson (57) ABSTRACT

An unmanned aerial vehicle comprising a velocity sensing system is provided. The velocity sensing system comprises a transmitter configured to transmit a first acoustic signal having at least a first frequency and a receiver, configured to detect a second acoustic signal comprising the first acoustic signal after it has been reflected from a reflective surface. The velocity sensing system is configured to determine from the second acoustic signal a second frequency, said second frequency comprising the first frequency after having undergone a Doppler shift; and to use the first and second frequencies to determine a velocity at which the unmanned aerial vehicle is travelling relative to the reflective surface.

24 Claims, 3 Drawing Sheets

(51) Int. Cl.
*G01C 3/00* (2006.01)
*G01L 19/00* (2006.01)

(58) Field of Classification Search
USPC .......................................................... 367/91
See application file for complete search history.

(56) References Cited

U.S. PATENT DOCUMENTS

| | | | | |
|---|---|---|---|---|
| 5,517,196 | A * | 5/1996 | Pakett | .................... G01S 13/931 |
| | | | | 342/70 |
| 8,157,205 | B2 * | 4/2012 | McWhirk | ................. B64B 1/06 |
| | | | | 244/30 |
| 10,122,479 | B2 * | 11/2018 | Dzierwa | .............. H04B 17/391 |
| 2008/0243383 | A1 * | 10/2008 | Lin | ....................... G08G 5/0078 |
| | | | | 701/469 |
| 2010/0152933 | A1 | 6/2010 | Smoot et al. | |
| 2013/0201316 | A1 * | 8/2013 | Binder | .................... H04L 67/12 |
| | | | | 348/77 |
| 2013/0325217 | A1 | 12/2013 | Seydoux et al. | |
| 2016/0291594 | A1 | 10/2016 | Zhao et al. | |
| 2017/0059704 | A1 | 3/2017 | Xie et al. | |
| 2017/0176188 | A1 | 6/2017 | Georgy et al. | |
| 2019/0339384 | A1 * | 11/2019 | Peng | ....................... G08G 5/045 |
| 2021/0141051 | A1 * | 5/2021 | Booij | ........................ G01S 5/18 |

FOREIGN PATENT DOCUMENTS

| | | |
|---|---|---|
| KR | 101559898 B1 | 10/2015 |
| WO | 16176854 A1 | 11/2016 |
| WO | 2017135371 A1 | 8/2017 |

OTHER PUBLICATIONS

International Preliminary Report on Patentability for International Patent Application No. PCT/GB2018/053755, dated Jul. 16, 2020, 8 pages.

* cited by examiner

VELOCITY DETECTION IN AUTONOMOUS DEVICES

This application is a 35 U.S.C. § 371 national phase filing of International Application No. PCT/GB2018/053755 filed on Dec. 21, 2018, and claims the benefit of United Kingdom Patent Application No. 1800028.1 filed on Jan. 2, 2018, wherein the disclosures of the foregoing applications are hereby incorporated by reference herein in their respective entireties.

This invention relates to velocity detection, particularly velocity detection devices of autonomous vehicles.

Partially, or fully autonomous vehicles, for example unmanned aerial vehicles (UAVs, commonly referred to as drones), require accurate and up-to-date position and velocity data in order to navigate correctly and avoid potentially dangerous collisions.

Known methods of velocity measurement utilised by autonomous vehicles include the use of systems based upon a global navigation satellite networks (e.g., GPS, GLONASS, GALILEO), electromagnetic time-of-flight methods (e.g., RADAR, LIDAR), or dead reckoning using an inertial measurement unit (IMU). For many applications, however, these methods are either unsuitable, prohibitively expensive, or cannot provide the required reliability and accuracy.

Satellite based systems are often convenient to implement, as they enable relatively accurate (<5 m resolution) position and elevation measurements with reasonable update frequency, allowing velocities to be easily calculated. They can also be implemented in low power, low weight chips. However, these systems require an unobstructed view of the sky to operate reliably and so can struggle in some settings, for example in built up areas or inside buildings.

Electromagnetic time-of-flight based systems can perform accurate distance measurements and do not suffer the same operational limitations as satellite based systems; however, they require the provision of an infrastructure of fixed beacons with known positions in order to operate.

The present invention seeks to provide an alternative approach to velocity detection.

From a first aspect, the invention provides an unmanned aerial vehicle comprising a velocity sensing system, the velocity sensing system comprising:

a transmitter configured to transmit a first acoustic signal having at least a first frequency;

a receiver, configured to detect a second acoustic signal comprising the first acoustic signal after it has been reflected from a reflective surface; wherein the velocity sensing system is configured to determine from the second acoustic signal a second frequency, said second frequency comprising the first frequency after having undergone a Doppler shift; and to use the first and second frequencies to determine a velocity at which the unmanned aerial vehicle is travelling relative to the reflective surface.

Thus it will be seen by those skilled in the art that in accordance with the present invention determination of the velocity of an unmanned aerial vehicle (UAV) may be determined by comparing a frequency of the transmitted signal and a frequency of the Doppler shifted received signal. The Doppler effect, as will be explained in more detail below, shifts the first frequency by an amount which is dependent on the velocity of the UAV relative to the reflective surface. By measuring the second frequency this shift can be calculated and used to determine the relative velocity.

Time-of-flight based ultrasonic range detectors are widely used to calculate distances and positions; however, velocity measurements made using these (i.e., by taking several position measurements over a period of time) are slow to update, and can be easily thrown off by intervening surfaces and objects. They are therefore particularly unsuited for busy environments featuring several and/or non-static reflective surfaces, e.g., inside buildings, built up areas, wooded areas or crowded areas. Contrastingly, velocity measurements made using the Doppler based technique as disclosed herein are typically not affected by intervening surfaces, as the Doppler induced change in frequency is independent of the proximity of the velocity sensing system to the reflecting surface.

When a sound wave is transmitted from and received by a transmitter and a receiver which are moving relative to each other, a Doppler shift in the frequency of the wave is observed by the receiver. The movement of the transmitter and/or receiver at non-negligible speeds causes the frequency of the received sound waves to shift from the transmitted frequency by a measurable amount. When the transmitter and receiver move towards each other, the frequency measured by the receiver is higher than that broadcast by the transmitter, and when the transmitter and receiver are moving away from each other the measured frequency is lower than that broadcast by the transmitter.

The degree to which the frequency shifts is a function of the velocities of the transmitter and receiver (assuming the medium through which they move is static). The change in frequency follows the relationship:

$$f_{received} = f_{transmitted} \times \left(\frac{c + v_r}{c + v_s}\right)$$

where c is the speed of sound, $v_r$ is the velocity of the receiver (positive for receivers moving towards the source) and $v_s$ is the velocity of the source (positive for sources moving away from the receiver). In the case where a single moving object travelling at a velocity v towards a static reflective surface transmits a sound wave and receives the same sound wave after being reflected from the reflective surface, the wave is Doppler shifted twice, such that:

$$f_{received} = f_{transmitted} \times \left(\frac{c + v}{c - v}\right).$$

At velocities typically experienced by unmanned aerial vehicles, where v<<c, this formula may be approximated as:

$$f_{received} = f_{transmitted} \times \left(\frac{c + 2v}{c}\right).$$

Even though the transmitter and receiver are collocated (i.e., stationary relative to each other), because the acoustic signal is reflected from a surface which is moving relative to the transmitter and receiver before being detected by the receiver, a difference in frequencies dependent on the velocity of the object is observed as described above. By measuring the second (received) frequency, and using knowledge of the first (transmitted) frequency, the velocity of the UAV may be calculated:

$$v = c \times \left( \frac{f_{received} - f_{transmitted}}{2 f_{transmitted}} \right).$$

This formula also applies to the scenario in which the UAV is moving away from the reflective surface (when v is negative).

In preferred embodiments, the acoustic signals emitted by the transmitter are ultrasonic. For example, they may have a frequency of at least 20 kHz, e.g., 40 kHz. Ultrasonic waves are not readily absorbed or dispersed in air, changes in frequency resulting from non-negligible velocities are measurable without high precision and expensive components, and widely available small, inexpensive and lightweight emitters and receivers can be used.

Acoustic signals require a medium through which to propagate. For an unmanned aerial vehicle this medium is typically air, in which changes of temperature, pressure and humidity can influence of the speed at which sound waves propagate. Accordingly, in some embodiments the velocity sensing system is configured to compensate for changes in temperature and/or pressure when determining the velocity. In some such embodiments the UAV comprises a temperature sensor configured to output a measure of the local air temperature and/or an ambient pressure sensor and/or a humidity sensor. The velocity sensing system may be configured to use one or more of these when determining the velocity.

Although the velocity sensing system disclosed herein may be able to indirectly measure changes in distance, by integrating several velocity measurements, the measurements described do not give direct absolute distance determination. The Applicant, however, has appreciated that there are many scenarios in which having only velocity information is useful. For example, the unmanned aerial vehicle may comprise a reinforcing or cushioning structure which enables the vehicle to withstand collisions that occur at relatively low speed. So long as the velocity of the vehicle is monitored and the vehicle is controlled to keep it below a threshold velocity, safe operation of the vehicle can be achieved without any knowledge of the position of the vehicle.

While, as mentioned above, absolute distance determination is not always required, the Applicant has appreciated that it is possible to use the components of the velocity sensing system described herein to determine distance information. In some embodiments therefore, the velocity sensing system is further configured to measure the signal strength of the second acoustic signal. Changes in the signal strength may be used to refine determinations of velocity, but the signal strength may also be used to estimate the absolute distance between the UAV and the reflective surface. Attenuation of the acoustic signals by an intervening medium means that the signal strength of the second acoustic signal is influenced by the distance through the medium it has to travel. By measuring the signal strength of the second acoustic signal, this attenuation can be quantified and used to estimate a separation distance between the UAV and the reflective surface.

The first acoustic signal may be continuously emitted by the velocity sensing system, although alternatively it may also be possible to operate the velocity sensing system in a pulsed-mode, in which the first acoustic signal is emitted in a fixed-length pulse. By doing so the velocity sensing system can also act as a distance sensor akin to conventional ultrasonic rangefinders, by measuring the delay between the sending of pulses of the first acoustic signal and receiving corresponding pulses of the second acoustic signal. When the velocity sensing system operates in this pulsed-mode, position measurements may be made at the same time as velocity measurements. However, there is a trade-off between precision in position and precision in velocity, which must be balanced depending on the application.

In some situations, the second acoustic signal may comprise signals reflected from two surfaces which are moving at different speeds relative to the UAV. In some embodiments, it may be possible to extract additional information about the reflecting surfaces (i.e., distinguish between their relative speeds) by applying additional processing to the second acoustic signal. In such embodiments the velocity determined from the second acoustic signal oscillates over time due to interference between the signals from the two surfaces, and the frequency and amplitude of these oscillations may be measured and used to determine the relative velocity and signal strength from each of the two surfaces separately. Being able to determine velocity relative to two distinct surfaces can be very useful for obstacle avoidance. For example, in a scenario in which an object is moving towards the UAV while at the same time the UAV is moving away from a wall, it is important to be able to distinguish the two distinct movements in order to successfully avoid a collision.

The Applicant has appreciated, however, that it is not possible to tell simply by analyzing the frequency and amplitude of these oscillations whether or not the reflected signal is produced by two distinctly moving surfaces, or simply a single surface with a time-dependent velocity (i.e., one surface moving back and forth). The velocity sensing system may be configured, in this scenario, to assume that oscillations with a frequency above a certain threshold are not due to a single moving object (i.e., assume there is a maximum frequency at which objects in the surrounding environment may reasonably move), and are instead due to two surfaces. However, the velocity sensing system may also be configured to measure changes in the amplitude of the second acoustic signal over time caused by the interference of signals returned by two distinct surfaces. The presence or lack of interference enables the velocity sensing system to distinguish between single surfaces with time-varying velocity and multiple surfaces moving relative to each other.

In embodiments wherein the velocity sensing system is operated in a pulsed-mode, and several reflecting surfaces are present, the velocity sensing system may be configured to determine the relative velocity and distance between the velocity sensor and each of the detected reflecting surfaces.

The first acoustic signal may comprise a mixture of frequencies, for example it may comprise a chirp. However, in preferred embodiments the first acoustic signal comprises a pure tone, i.e., the first acoustic signal comprises a substantially single frequency sinusoidal waveform. A narrow spread in the frequency of the transmitted signal reduces the spread in the frequency of the received signal, reducing uncertainty in the velocity determination. In addition, transmitters with a limited bandwidth are typically less expensive to manufacture.

The velocity sensing system may measure the second frequency by directly sampling the second acoustic signal at a sufficiently high sample rate, and using a processor to analyze the sampled signal. The Applicant has appreciated, however, that this approach necessitates the use of high power (in terms of both energy and processing power) and often expensive components. In preferred embodiments therefore the velocity sensing system comprises:
- a signal conditioning module configured to convert the second ultrasonic signal into a square wave signal with the same frequency;
- a processor configured to measure a frequency of the square wave signal in order to determine the second frequency.

The Applicant has appreciated that by converting a sinusoidal signal into a square wave signal the processing power needed to measure the frequency may be reduced as basic digital logic can be used.

Accordingly, in some such embodiments the velocity sensing system comprises a system clock and the processor is configured to measure a separation in time between two rising edges in the square wave signal by counting a number of cycles of the system clock that occur between two rising edges of the square wave signal. As the system clock frequency is known, the frequency of the square wave signal can thus be easily determined.

The two rising edges may be consecutive rising edges in the square wave signal, such that the processor measures the duration of one cycle of the square wave signal, Alternatively the processor may be configured to measure the time taken for several periods of the square wave signal to elapse. In contrast to direct sampling, square wave conversion and counting as described above may be performed with low cost and low power digital components.

Measuring just one cycle of the square wave may produce a measurement of the frequency the fastest, but the accuracy of the measurement is typically reduced. The time resolution of a single square wave cycle measurement is limited by the frequency of the system clock (i.e., the moment when the square wave changed from low to high is not itself measured, the processor only knows that it happened between two ticks of the system clock). There may also be other sources of error present in frequency measurements, e.g., jitter in the square wave signal. Measuring more than one cycle of the square wave signal can reduce these errors but increases the length of time a frequency measurement takes. Measuring N cycles of the square wave reduces the random errors by a factor of 1/N.

The appropriate trade-off may be determined as appropriate for a given application. For example, if the velocity of the UAV is high, too much delay may correspond to a large distance travelled without accurate velocity information, which is undesirable for reasons of both safety and navigation. In preferred embodiments, at least 10 cycles of the square wave are measured, for example more than 20, 50 or 100 cycles.

Using a counting method as described above may add a small delay to frequency measurement compared to direct sampling; however, the Applicant has appreciated that this may be acceptable to achieve the aforementioned power savings.

The Applicant has appreciated that sometimes the second acoustic signal may be too weak and/or noisy to produce a square wave that is accurately indicative of its frequency (e.g., due to the reflecting surface being far away, attenuation of the acoustic signals or other noise). Without a comprehensible second acoustic signal the velocity sensing system would not be able to determine the velocity. Due to the time taken for the first acoustic signal to travel to the reflecting surface and back to the velocity sensing system, there may be a period of time after transmission when no second acoustic signal is detectable by the velocity sensing system. However, it may not be possible for the velocity sensing system to discriminate between scenarios in which no second acoustic signal is detected because it has not yet arrived back at the sensor and scenarios in which the second acoustic signal arrives at the sensor, but does not have a comprehensible frequency. In such a situation the velocity sensing system might not produce an updated velocity for a long time as it waits for the return of a second acoustic signal, when the signal has returned but cannot be measured.

Accordingly, in some embodiments the processor is configured to discard a measurement if no rising edge appears on the square wave signal for a pre-set period of time. The velocity sensing system may then start a new measurement. The velocity sensing system may also, in response to such a "fail-fast" event, increase the transmission power of a subsequently transmitted first acoustic signal, to increase the likelihood that a comprehensible second acoustic signal is detected. Additionally or alternatively, the velocity sensing system may increase an amplification gain applied to the received acoustic signal in response to a fail-fast event. In embodiments in which the velocity sensing system is operating in pulsed-mode, the velocity sensing system may increase the length of pulses used following a fail-fast event.

The pre-set period of time after which the processor discards a measurement is preferably based upon a maximum negative velocity that the system is expected to measure, for example around $-10$ ms$^{-1}$.

In some embodiments the processor is configured to ignore a rising edge on the square wave signal if it appears within a minimum threshold of a previous rising edge. This prevents invalid signals, from electrical or acoustic noise for example, producing an erroneous velocity measurement. The minimum threshold may be based upon a maximum positive velocity that the system is expected to measure, for example around $+10$ ms$^{-1}$.

The signal conditioning module may comprise a high pass filter, which may serve to eliminate any DC offset in the detected acoustic signal. The signal conditioning module may comprise an amplifier and preferably the signal conditioning module comprises an analogue comparator circuit. Preferably the analogue comparator circuit has adjustable hysteresis, for example the analogue comparator circuit may comprise a Schmitt trigger. Such a comparator is beneficial as low-voltage transitions (e.g., from electrical and acoustic noise) are discarded.

The transmitter may comprise an electrical transducer configured to convert electrical signals into acoustic signals. Similarly, the receiver may comprise an electrical transducer configured to convert acoustic signals into electrical signals. Preferably the transmitter is driven by a transducer driver circuit. In preferred embodiments the transmitter and/or the receiver comprise MEMS transducers, for example piezoelectric or capacitive ultrasonic transducers.

The transducer driver circuit may comprise a half H bridge circuit or a full H bridge, or any type of suitable driver circuit that is known in the art. Full H bridge circuits are able to deliver more power to the transmitter, which may increase the range of the velocity sensing system and/or may enable it to work even if the reflective surface is a poor acoustic reflector. Characteristics of the transducer driver circuit may be chosen to balance power requirements with range.

In some embodiments the transducer driver circuit is connected to a frequency generator which generates an electrical drive signal with the first frequency. Preferably the frequency generator is controlled by the processor, and uses the system clock to generate the electrical drive signal. Using the same system clock to generate the first frequency and to measure the second frequency may mean that fluctuations in the system clock frequency (e.g., due to changes in ambient temperature) are cancelled out and do not impact on the accuracy of velocity determinations (assuming that any changes occur slowly compared to the time taken for the acoustic signals to be transmitted and reflected). Using the same system clock also eliminates the need to calibrate the device to compensate for any differences introduced during production of the different components.

As explained above, in some embodiments the velocity sensing system is arranged to be operated in a pulsed-mode. In some such embodiments the velocity sensing system may comprise a single transducer which both transmits the first acoustic signal and detects the second acoustic signal. In some such embodiments the velocity sensing system comprises switching circuitry which is configured to switch the single transducer between transmit and receive mode. Using a single physical component to transmit and receive may reduce the part count, the cost and the weight of the velocity sensing system. Operating the velocity sensing system in a pulsed-mode may also save power.

The resolution and measurement rate achievable by the velocity sensing system disclosed herein depends upon the transmission frequency and the magnitude (and direction) of the velocity itself. When the transmission frequency is 40 KHz and the system clock frequency is 16 MHz, a resolution of approximately 1 $cms^{-1}$ at a measurement rate of approximately 400 Hz is possible for typical UAV velocities (i.e., moving towards or away from the reflective surface at less than 20 m/s).

In some embodiments the unmanned aerial vehicle further comprises a controller configured to control the motion of the unmanned aerial vehicle, wherein the controller is configured to use the velocity determined by the velocity sensing system when controlling the motion of the unmanned aerial vehicle.

In some embodiments the controller is configured to use the velocity determined by the velocity sensing system to control the UAV to maintain a constant velocity. Additionally or alternatively the controller may use the determined velocity for obstacle avoidance. As explained above, the Doppler based method described herein may be robust even in crowded environments and as such it is particularly suited to obstacle avoidance. The UAV may be partially or completely autonomous, such that direct control of its movement is not provided by a human operator. For example, in some embodiments a user may define a destination location, and the UAV may be configured to navigate to that location with no further control input from the user. Alternatively, the velocity sensing system may form part of a basic safety and/or stability system, wherein an operator must still provide steering input to the UAV but the safety and/or stability system may provide warnings of imminent collisions to a user and/or may take control of the UAV so as to avoid such a collision.

In some embodiments the at least one velocity sensing system is configured to determine the vertical velocity of the UAV (i.e., it is oriented such that the ground or floor comprises the reflective surface). In some such embodiments the UAV comprises at least one deformable landing structure, which is arranged to cushion the UAV upon landing to mitigate sudden changes in momentum. This enables the UAV to land safely when travelling with a downward velocity below a landing threshold determined by the properties of the landing leg(s). In such embodiments, so long as the vertical velocity of the UAV is maintained below the landing threshold, it is not necessary to continually monitor the precise vertical position of the UAV to ensure safe operation.

Additionally or alternatively, the UAV may comprise one or more horizontally orientated velocity sensing systems. In some embodiments the UAV comprises a plurality of velocity sensing systems, oriented in a plurality of directions (e.g., oriented orthogonally). This enables a complete 3D picture of the motion of the UAV to be built up.

In some embodiments the UAV further comprises an inertial measurement unit (IMU) arranged to output further sensor data, which may comprise one or more of an accelerometer, an angular rate sensor or a magnetometer. Sensor data from such an IMU may be used to aid the determination of the velocity, position and orientation of the UAV. Additionally or alternatively, the UAV may further comprise an altitude sensor, (e.g., a barometric pressure sensor or an ultrasonic rangefinder), configured to determine the altitude of the UAV.

Preferably the controller is configured to utilise data provided by a plurality of available sensors when controlling the UAV.

As previously discussed, many velocity measurement systems known in the art often cannot operate satisfactorily indoors. Embodiments of the present invention, however, may operate advantageously in an indoor environment, as indoor environments often feature several flat, reflective walls.

The invention also extends to a method of determining a velocity of an unmanned aerial vehicle comprising:

transmitting, using a transmitter on the unmanned aerial vehicle, a first acoustic signal having at least a first frequency;

detecting, using a receiver on the unmanned aerial vehicle, a second acoustic signal comprising the first acoustic signal after it has been reflected from a reflective surface;

determining from the second acoustic signal a second frequency, said second frequency comprising the first frequency after having undergone a Doppler shift; and using the first and second frequencies to determine the velocity at which the unmanned aerial vehicle is travelling relative to the reflective surface.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which.

Figure 1:
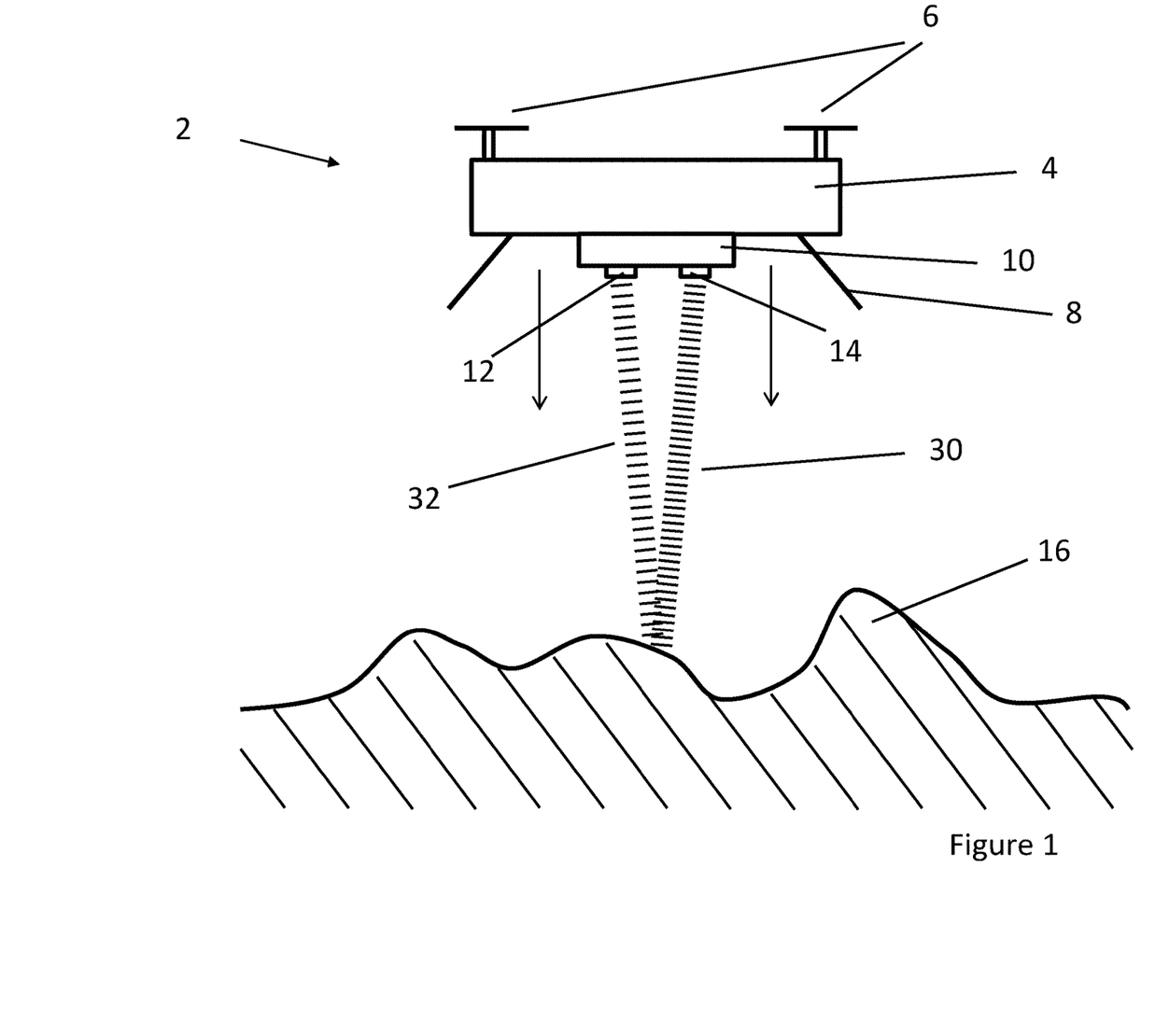
FIG. 1 shows a UAV equipped with a velocity sensing system according to an embodiment of the present invention.

FIG. 1 shows an unmanned aerial vehicle 2 (UAV) according to an embodiment of the present invention. The UAV 2 comprises a main chassis 4 to which rotors 6, landing legs 8 and a velocity sensor 10, are attached. Although not illustrated here, the UAV 2 also comprises other typical components as are known in the art per se, for example an energy source (e.g., a battery), a controller and drive means with which the rotors 6 are driven. The velocity sensor 10 comprises an ultrasound transmitter 12 and an ultrasound receiver 14 and is configured, as will be described later, to measure the velocity of the UAV 2 relative to a reflecting surface.

The UAV 2 is illustrated as descending towards an uneven surface 16. The velocity sensor 10 is configured with the transmitter and receiver oriented vertically downwards, such that the vertical velocity of the UAV 2 relative to the surface 16 may be measured by the velocity sensor 10. The transmitter 12 transmits an ultrasonic signal 30 towards the surface 16, and the receiver measures a (Doppler shifted) reflected signal 32. The velocity sensor 10 is configured to measure the frequency of the reflected signal 32 in order to determine the vertical velocity of the UAV 2.

The determined vertical velocity may be used when controlling the UAV 2 during normal flight, for example to maintain level flight the UAV 2 must ensure that its vertical velocity is zero. The controller may control the drive means in response to a determined velocity accordingly (e.g., by increasing the speed of the rotors 6 when a descending velocity is detected and vice versa).

Many of the internal and external components of the UAV 2 are typically fragile, and as such collisions between the main body 4 and another object or surface can be highly damaging and are undesirable. The UAV 2, however, must be able to land safely and on a variety of terrain, and to facilitate this the landing legs 8 have a degree of flexibility, so that during a vertical landing the main body 4 does not experience a large and potentially damaging impulse. Instead, the landing legs 8 "cushion" the UAV 2 by flexing and mitigating abrupt changes in velocity.

While the landing legs 8 can decrease the risk to the UAV 2 when landing, they are only effective when operating below a certain landing velocity threshold. Above this threshold and the landing legs 8 may not be able to protect the main body 4 from damaging impacts and/or impulses. Therefore, it is desirable to keep the vertical velocity of the UAV 2 below the landing velocity threshold when executing a landing.

During a landing onto the surface 16 therefore, the velocity sensor 10 provides vertical velocity measurements to the controller, which controls the speed of the rotors 6 in response so that the UAV 2 does not exceed the landing velocity threshold relative to the surface 16.

Because the velocity sensor 10 utilises the Doppler Effect when determining velocity, the unevenness of the surface 16 does not influence the ability of the UAV 2 to accurately determine velocity. If the UAV 2 has even a small horizontal velocity, a conventional displacement sensor would measure a wildly varying displacement, making velocity determination and safe landing difficult. The velocity sensor 10, however, produces accurate measurements of vertical velocity results even when the level of the surface 16 is not constant. This is of course highly desirable when attempting a landing on uneven terrain.

The UAV 2 may further comprise an IMU (not shown), configured to provide orientation information (i.e., pitch/yaw/roll). This information may also be used by the controller to ensure that the UAV 2 remains oriented horizontally with respect to the surface (e.g., by controlling the speed of individual rotors 6 to counteract an orientation error). The orientation information may be used by the controller in conjunction with the determined velocity when the UAV 2 executes a landing.

Although not shown in FIG. 1, the UAV 2 may further comprise additional velocity sensors orientated in other directions, e.g., horizontally. The UAV 2 may use velocities determined by these additional sensors for navigation, or obstacle avoidance.

Figure 2:
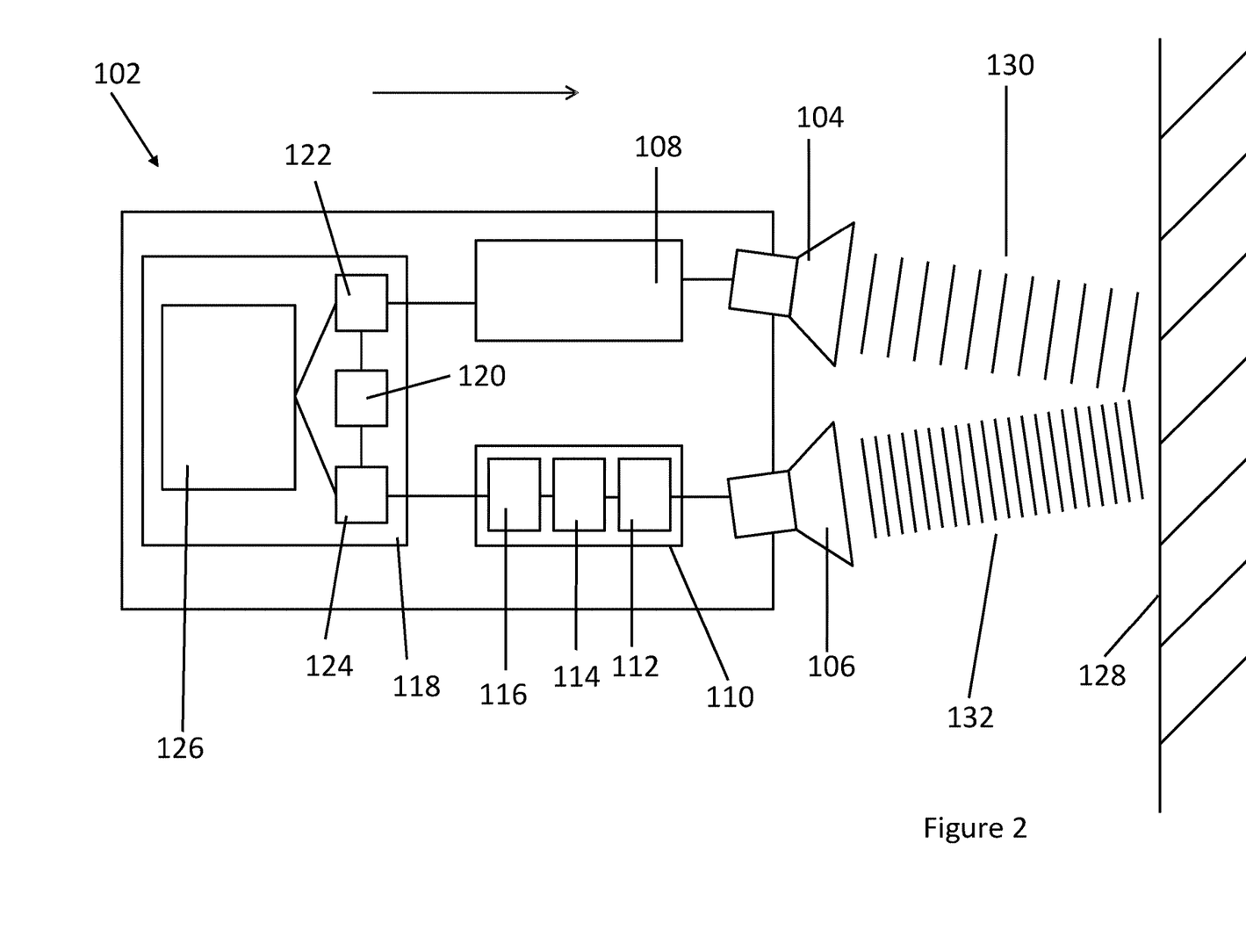
FIG. 2 shows a block diagram of a velocity sensing system.

FIG. 2 shows a detailed view of a velocity sensor 102 much like that provided on the UAV 2 of FIG. 1. The velocity sensor 102 comprises an ultrasonic transmitter 104 connected to an ultrasonic transducer driver circuit 108 and an ultrasonic receiver 106, which is connected to a signal conditioning module 110 comprising a high pass filter 112, an amplifier 114 and a comparator circuit 116. The velocity sensor 102 further comprises a microcontroller 118 comprising a system clock 120, a frequency generator 122, a frequency counter 124 and a processor 126.

The velocity sensor 102 may be moving with a velocity v towards a stationary wall 128. The frequency generator 122, clocked by the system clock 120, generates an electrical signal with a generated frequency $f_g$ and provides this to the ultrasonic transducer driver circuit 108. The ultrasonic transducer driver circuit 108 amplifies the signal and sends it to the ultrasonic transmitter 104, where it is transmitted as an incident acoustic signal 130, travelling at the speed of sound c towards the wall 128 with an incident frequency $f_i$. Because the velocity sensor 102 is moving in the direction of the incident acoustic signal 130 (towards the wall 128) at a velocity v, the incident acoustic signal 130 is Doppler shifted such that the incident frequency $f_i$ is higher than the generated frequency $f_g$ according to $f_i = f_g * c/(c-v)$.

The wall 128 is acoustically reflective, and reflects the incident acoustic signal 130 back towards the velocity sensor 102 as a reflected acoustic signal 132, with a reflected frequency of $f_r$ equal to the incident frequency $f_i$.

The reflected acoustic signal 132 travels at the speed of sound c towards the ultrasonic receiver 6, which detects the reflected acoustic signal 132 and converts it into a detected signal with a detected frequency $f_d$. Because the velocity sensor is moving towards the reflected signal 132 (and towards the wall 128) at a velocity v, the detected signal is Doppler shifted such that the detected frequency $f_d$ is higher than the reflected frequency $f_r$ according to $f_d = f_r(c+v)/c$.

The velocity v of the velocity sensor 102 can therefore be expressed as a function of the generated and detected frequencies $f_g$, $f_d$:

$$v = c\left(\frac{f_d - f_g}{f_d + f_g}\right).$$

The generated frequency $f_g$ is known by the velocity sensor. To determine the detected frequency $f_d$, the detected signal is sent to the signal conditioning module 110 which converts it into a square wave signal with the same frequency $f_d$. The square wave conversion process is explained in more detail below with reference to FIG. 2.

The square wave signal is then sent to the frequency counter 124, clocked by the system clock 120, where the number of ticks, N, of the system clock 120 taken for a predetermined number M of rising edges of the square wave signal to occur are counted. The detected frequency $f_d$ may be expressed as:

$$f_d = f_0 \frac{N}{M},$$

where $f_0$ is the frequency of the system clock. A higher value of M may result in a more accurate measurement of $f_d$;

however, a higher M also means that each measurement of $f_d$ takes longer. The accuracy and speed requirements of the velocity sensor must be assessed and balanced when deciding which value of M to use. Typically, a value of M>50, e.g., 100, 150 or 200 has been found to produce reasonably accurate measurements of $f_d$ with reasonable update times. The processor 126 may thus calculate v as a function of N according to:

$$v(N) = c\left(\frac{\frac{f_0 N}{M} - f_g}{\frac{f_0 N}{M} + f_g}\right).$$

Figure 3:
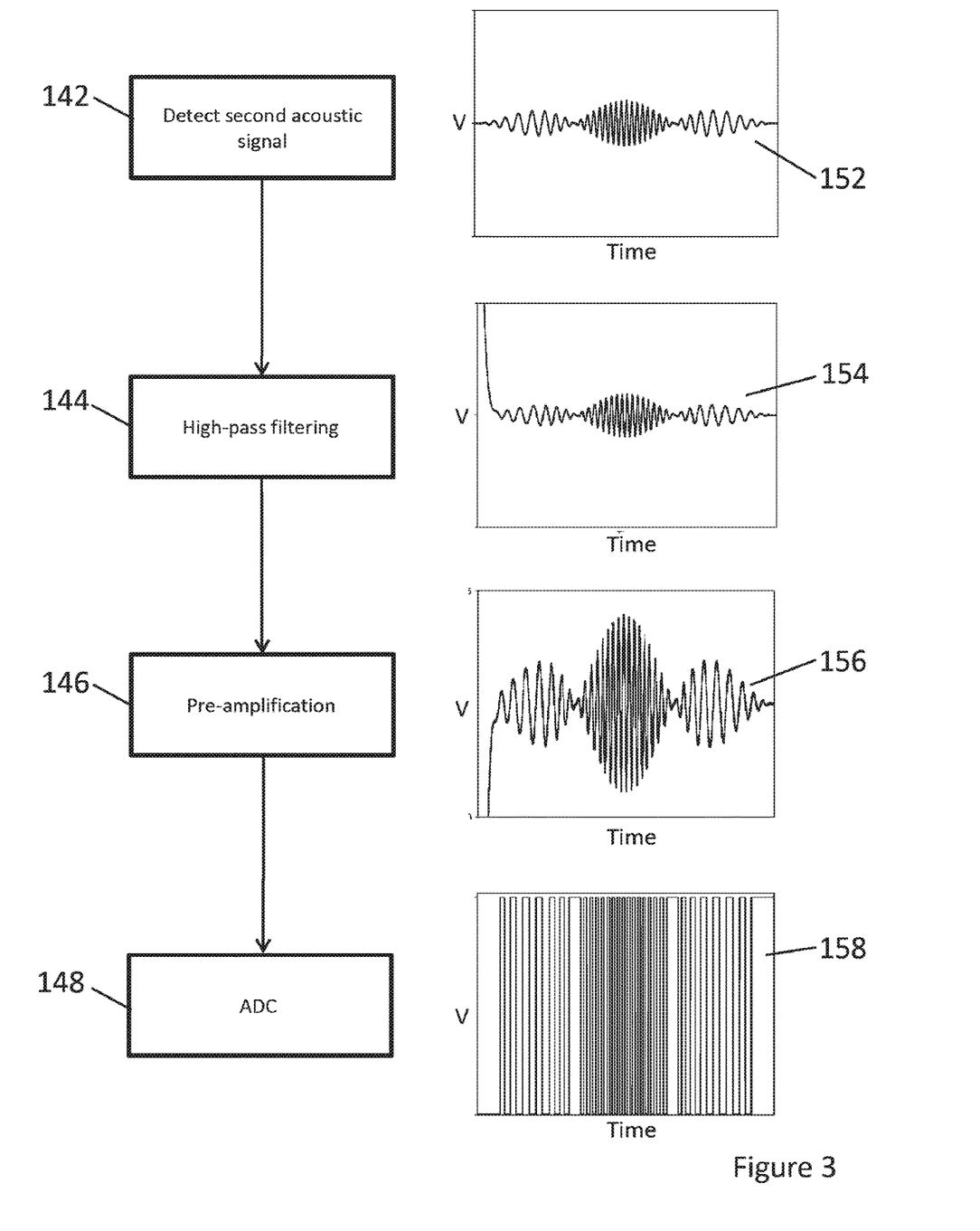
FIG. 3 is a flow diagram illustrating the operation of a signal conditioning module.

The operation of the signal conditioning module 110 will now be further described with reference to FIG. 3, which illustrates a signal comprising reflections from three different surfaces (located at different distances to and travelling at different velocities relative to the UAV 2), arranged sequentially in time. At step 142 the reflected acoustic signal 132 is detected by the receiver 116 and converted into an electrical detected signal 152, which comprises a sinusoidal oscillating signal with a DC offset of around 1 V.

At step 144 the detected signal 152 passes through a first-order high pass filter 112, to produce a filtered signal 154 which has no DC offset but maintains the same oscillations as the detected signal 152. In step 146 a DC offset is added to the filtered signal 152 to centre it on 2.5 V, and then the filtered signal 152 is amplified by the amplifier 114 to produce an amplified signal 156.

The amplifier 114 amplifies the filtered signal 152 with a gain that is adjusted such that the largest amplitude in the signal just fits inside the voltage range of the device (in this case 0-5 V). The largest amplitude peaks in the filtered signal 152 are caused from stronger reflections (e.g., from close and/or highly reflective objects).

Finally, at step 148 the amplified signal 156 is sent to an analogue comparator circuit with hysteresis 116 (a Schmitt trigger) which converts the analogue sinusoidal signals into square waves, while the adjustable hysteresis discards low voltage transitions (e.g., introduced by electrical and/or acoustic noise). This produces a square wave signal 158, which may then be analyzed by the processor 126 as described above.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An unmanned aerial vehicle comprising a velocity sensing system, the velocity sensing system comprising:
  a transmitter configured to transmit a first acoustic signal having at least a first frequency; and
  a receiver, configured to detect a second acoustic signal comprising the first acoustic signal after the first acoustic signal has been reflected from a reflective surface; wherein
  the velocity sensing system is configured to determine from the second acoustic signal a second frequency, said second frequency comprising the first frequency after having undergone a Doppler shift;
  the velocity sensing system is configured to measure a signal strength of the second acoustic signal; and
  the velocity sensing system is configured to use the first and second frequencies to determine a velocity at which the unmanned aerial vehicle is travelling relative to the reflective surface.

2. The unmanned aerial vehicle as claimed in claim 1, wherein the first acoustic signal transmitted by the transmitter is ultrasonic.

3. The unmanned aerial vehicle as claimed in claim 1, wherein the unmanned aerial vehicle comprises at least one sensor selected from the group consisting of (i) a temperature sensor configured to output a measure of a local air temperature, (ii) an ambient pressure sensor, and (iii) a humidity sensor.

4. The unmanned aerial vehicle as claimed in claim 1, wherein the velocity sensing system is configured to use an output of one or more of the temperature, humidity and pressure sensors when determining the velocity.

5. The unmanned aerial vehicle as claimed in claim 1, wherein the unmanned aerial vehicle comprises a reinforcing or cushioning structure.

6. The unmanned aerial vehicle as claimed in claim 1, wherein the velocity sensing system is operated in a pulsed-mode, in which the first acoustic signal is emitted in a fixed-length pulse.

7. The unmanned aerial vehicle as claimed in claim 1, wherein the velocity sensing system is configured to measure changes in amplitude of the second acoustic signal over time caused by interference of signals returned by two distinct surfaces.

8. The unmanned aerial vehicle as claimed in claim 7, wherein the velocity sensing system is configured to determine a relative velocity and distance between the unmanned aerial vehicle and each of the two distinct surfaces.

9. The unmanned aerial vehicle as claimed in claim 1, wherein the velocity sensing system comprises:
  a signal conditioning module configured to convert the second acoustic signal into a square wave signal with the same frequency as the second acoustic signal; and
  a processor configured to measure a frequency of the square wave signal in order to determine the second frequency.

10. The unmanned aerial vehicle as claimed in claim 9, wherein the velocity sensing system comprises a system clock, and the processor is configured to measure a separation in time between two rising edges in the square wave signal by counting a number of cycles of the system clock that occur between two rising edges of the square wave signal.

11. The unmanned aerial vehicle as claimed in claim 10, wherein the processor is configured to discard a measurement if no rising edge appears on the square wave signal for a pre-set period of time.

12. The unmanned aerial vehicle as claimed in claim 10, wherein the processor is configured to ignore a rising edge on the square wave signal if it appears within a minimum threshold of a previous rising edge.

13. The unmanned aerial vehicle as claimed in claim 9, wherein the signal conditioning module comprises a high pass filter, an amplifier, and an analog comparator.

14. The unmanned aerial vehicle as claimed in claim 9, wherein the velocity sensing system is arranged to be operated in a pulsed-mode.

15. The unmanned aerial vehicle as claimed in claim 14, wherein the velocity sensing system comprises a single transducer which both transmits the first acoustic signal and detects the second acoustic signal.

16. The unmanned aerial vehicle as claimed in claim 1, further comprising a controller configured to control the motion of the unmanned aerial vehicle, wherein the controller is configured to use the velocity determined by the velocity sensing system when controlling the motion of the unmanned aerial vehicle.

17. The unmanned aerial vehicle as claimed in claim 16, wherein the controller is configured to use the velocity determined by the velocity sensing system to control the unmanned aerial vehicle to maintain a constant velocity.

18. The unmanned aerial vehicle as claimed in claim 16, wherein the controller is configured to use the velocity determined by the velocity sensing system to control the unmanned aerial vehicle to avoid obstacles.

19. The unmanned aerial vehicle as claimed in claim 1, wherein the velocity sensing system is configured to determine a vertical velocity of the unmanned aerial vehicle.

20. The unmanned aerial vehicle as claimed in claim 19, wherein the unmanned aerial vehicle comprises at least one deformable landing structure.

21. The unmanned aerial vehicle as claimed in claim 1, further comprising a plurality of velocity sensing systems, oriented in a plurality of directions.

22. The unmanned aerial vehicle as claimed in claim 1, further comprising an inertial measurement unit arranged to output further sensor data, wherein the inertial measurement unit comprises one or more of an accelerometer, an angular rate sensor, and a magnetometer.

23. The unmanned aerial vehicle as claimed in claim 1, further comprising an altitude sensor configured to determine the altitude of the unmanned aerial vehicle.

24. A method of determining a velocity of an unmanned aerial vehicle comprising:
- transmitting, using a transmitter on the unmanned aerial vehicle, a first acoustic signal having at least a first frequency;
- detecting, using a receiver on the unmanned aerial vehicle, a second acoustic signal comprising the first acoustic signal after the first acoustic signal has been reflected from a reflective surface;
- determining from the second acoustic signal a second frequency, said second frequency comprising the first frequency after having undergone a Doppler shift;
- measuring a signal strength of the second acoustic signal; and
- using the first and second frequencies to determine a velocity at which the unmanned aerial vehicle is travelling relative to the reflective surface.

* * * * *